(12) United States Patent
Haas et al.

(10) Patent No.: US 10,413,929 B2
(45) Date of Patent: Sep. 17, 2019

(54) PROTECTIVE SHIELD DEVICE FOR A TRAVEL RAIL

(71) Applicant: Dürr Systsems GmbH, Bietigheim-Bissingen (DE)

(72) Inventors: Jürgen Haas, Knittlingen (DE); Gerhard Alonso, Bönnigheim (DE); Detlev Hannig, Winterbach (DE); Frank Herre, Oberriexingen (DE); Roland Krieger, Bietigheim-Bissingen (DE); Joachim Donner, Ludwigsburg (DE)

(73) Assignee: DÜRR SYSTEMS GMBH, Bietigheim-Bissingen (DE)

( * ) Notice: Subject to any disclaimer, the term of this patent is extended or adjusted under 35 U.S.C. 154(b) by 476 days.

(21) Appl. No.: 15/111,909

(22) PCT Filed: Jan. 14, 2015

(86) PCT No.: PCT/EP2015/000059
§ 371 (c)(1),
(2) Date: Jul. 15, 2016

(87) PCT Pub. No.: WO2015/106965
PCT Pub. Date: Jul. 23, 2015

(65) Prior Publication Data
US 2016/0332183 A1   Nov. 17, 2016

(30) Foreign Application Priority Data
Jan. 16, 2014   (DE) .................. 10 2014 000 478

(51) Int. Cl.
*B05B 13/04* (2006.01)
*B25J 5/02* (2006.01)
(Continued)

(52) U.S. Cl.
CPC .......... *B05B 13/0452* (2013.01); *B05B 12/34* (2018.02); *B05B 13/0431* (2013.01); (Continued)

(58) Field of Classification Search
CPC ..... B05B 13/0452; B05B 12/34; B05B 12/32; B05B 12/36; B05B 1/28; B05B 13/0431; (Continued)

(56) References Cited

U.S. PATENT DOCUMENTS 2,728,238 A    12/1955 Paasche
3,606,162 A *   9/1971 Lehmann ............ B05B 13/0431
                                                    101/35

(Continued)

FOREIGN PATENT DOCUMENTS

CH         399348 A       9/1965
CN      201313087 Y       9/2009
(Continued)

OTHER PUBLICATIONS

International Search Report and Written Opinion for PCT/EP2015/000059 dated Mar. 26, 2015 (with English Translation; 13 pages).
(Continued)

*Primary Examiner* — William Kelleher
*Assistant Examiner* — Gregory Robert Weber
(74) *Attorney, Agent, or Firm* — Bejin Bieneman PLC

(57) ABSTRACT

A protective shield device for a travel rail is provided, the travel rail including at least one robot with an application element coupled thereon. The protective shield device comprises at least one protective shield component for protecting the travel rail from the application medium, e.g. paint, dispensed by the application element of the at least one robot. The protective shield device is configured to extend over a portion of the travel rail and to move relative to the travel rail.

9 Claims, 9 Drawing Sheets

Figure 1:
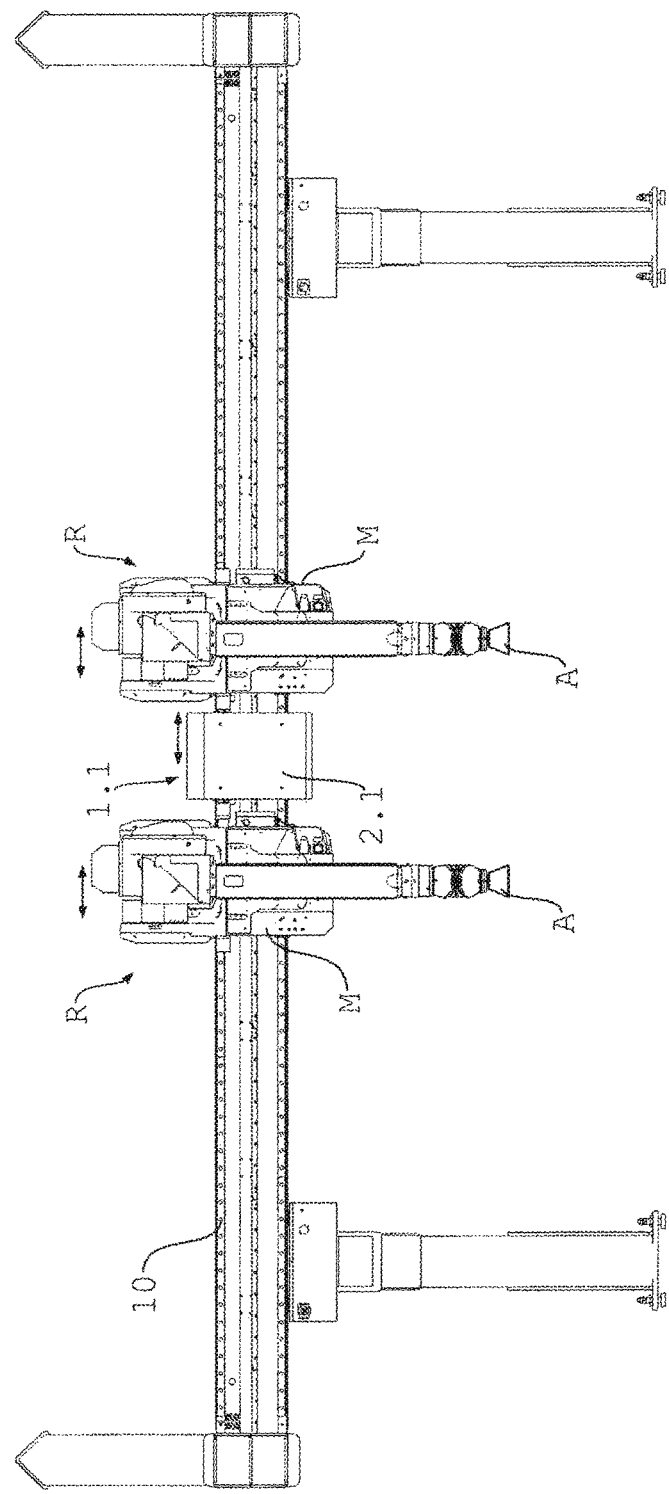

(51) Int. Cl.
*B05B 12/34* (2018.01)
*B25J 11/00* (2006.01)
*B25J 19/00* (2006.01)

(52) U.S. Cl.
CPC .............. *B25J 5/02* (2013.01); *B25J 11/0075* (2013.01); *B25J 19/0075* (2013.01)

(58) Field of Classification Search
CPC ...... B25J 5/02; B25J 11/0075; B25J 19/0075; B25J 9/026
USPC .................... 74/499.01; 901/49, 43; 294/131
See application file for complete search history.

(56) References Cited

U.S. PATENT DOCUMENTS

| 5,871,283 | A | 2/1999 | Isobe et al. | |
|---|---|---|---|---|
| 6,910,446 | B2 * | 6/2005 | Johnston, Jr. .......... | A01K 45/00 |
| | | | | 119/651 |
| 2008/0251011 | A1 | 10/2008 | Albrecht | |
| 2011/0166708 | A1 * | 7/2011 | Herre ................. | B05B 13/0431 |
| | | | | 700/258 |

FOREIGN PATENT DOCUMENTS

| CN | 102728508 | A | | 10/2012 |
|---|---|---|---|---|
| CN | 203343793 | U | * | 12/2013 |
| CN | 203343793 | U | | 12/2013 |
| DE | 3911454 | A1 | | 10/1990 |
| DE | 102004040161 | A1 | | 3/2006 |
| DE | 102004056285 | A1 | | 5/2006 |
| DE | 102012211135 | A1 | | 1/2014 |
| EP | 0192338 | A1 | | 8/1986 |
| GB | 2263422 | A | | 7/1993 |
| JP | H02-53585 | A | * | 2/1990 |
| JP | H09264323 | A | | 10/1997 |
| KR | 20130000265 | A | * | 1/2013 |
| KR | 20130000265 | A | | 1/2013 |
| WO | 2004043612 | A1 | | 5/2004 |

OTHER PUBLICATIONS

Chinese Search Report for CN Patent Application No. 201580004682.6 dated Jun. 5, 2018 (with English translation; 4 pages).
Chinese Office Action for CN Application No. 201580004682.6 dated Mar. 6, 2019 (9 pages).

* cited by examiner

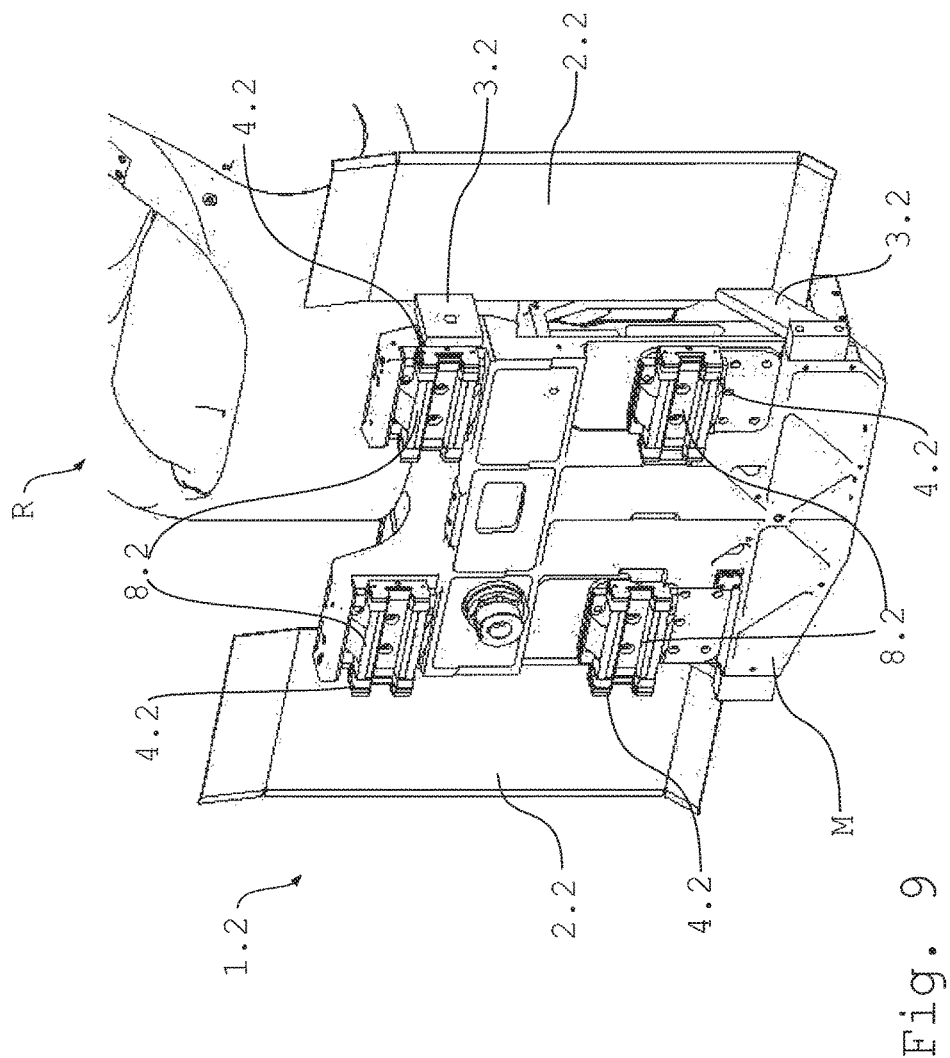

PROTECTIVE SHIELD DEVICE FOR A TRAVEL RAIL

CROSS-REFERENCE TO RELATED APPLICATIONS

This application is a national stage of, and claims priority to, Patent Cooperation Treaty Application No. PCT/EP2015/000059, filed on Jan. 14, 2015, which claims priority to German Application No. DE 10 2014 000 478.3 filed on Jan. 16, 2014, each of which applications are hereby incorporated herein by reference in their entireties.

BACKGROUND

The disclosure relates to a protective shield device for a travel rail (travel axis) along which at least one robot having an application element can be moved. The protective shield device may be applied, e.g., in a painting installation, especially for coating motor vehicle bodies and/or attachment parts therefor.

A painting installation with a travel rail is known from EP 0 192 338 A1, along such a travel rail a robot with an application element can be moved. There is a risk, however, particularly if the application element is an atomizer for applying paint, that the travel rail becomes soiled by the sprayed paint. For example, in such an arrangement, the paint can land on the travel rail directly from the atomizer. In another example, the paint can land on the travel rail indirectly as overspray. Overspray refers to the portion of sprayed paint which does not land on the workpiece to be painted and is carried, e.g., from the paint booth by a fresh air flow.

Such a soiled travel rail must be cleaned, typically manually. However, cleaning takes time and can only be carried out during robot downtime and/or general downtime of the paint installation.

A mechanism having a spray gun is known from DE 1 805 145 A, where lifting stand guide rails are fully encased with bellows. The bellows are assembled permanently at one longitudinal end in order for them to be extended and compressed like a concertina or an accordion. The bellows are very susceptible to being soiled. Particularly, the folds or gaps are susceptible to collecting dirt. Cleaning the bellows is time-consuming and also only during spray installation downtime. Moreover, there is a risk of adhesion with the bellows and a risk that dried dirt can drop off or flake off again. U.S. Pat. No. 2,728,238 A, GB 2 263422 A, DE 39 11 454 A1 and CH 399 348 A are cited as general technical background.

SUMMARY

According to the present disclosure, cleaning intervals for travel rails, on which at least one robot having an application element is movable, can at least be extended, and, in some embodiments, the cleaning requirement can be almost entirely removed.

According to the present disclosure, a protective shield device is provided for a travel rail (travel axis) along which travel rail at least one robot having an application element can be moved. The protective shield device is likewise movable along the travel rail, in some embodiments in a translatory motion. In some embodiments, the protective shield device is configured for movable direct mounting on the travel rail. Alternatively or additionally, through the protective shield device is configured for mounting on a robot movable along the travel rail in order to move together with the robot.

The protective shield device comprises at least one protective shield for protecting the travel rail from the application medium (e.g. paint) dispensed by the application element (e.g. an atomizer).

The protective shield may be used as protection, particularly screening, for the travel rail from overspray and/or from direct spraying with an application medium during an application process.

In some embodiments, the protective shield device is configured for mounting on the travel rail. In other embodiments, the protective shield device is configured for mounting on at least one robot.

In embodiments where the protective shield device is configured for mounting on the travel rail, the protective shield device comprises at least one mounting device (i.e. guide carriage), which is configured for movable, direct mounting on the travel rail.

In some such embodiments, the protective shield device itself is constructed driveless—i.e. it has no particular drive motor, no drive unit, etc.—but is in fact movable, particularly through sliding (e.g. it can be slid, thrusted, pulled, etc.), by the at least one robot. The at least one robot can thus be used as drive device for the protective shield device.

In such embodiments, the protective shield device may be configured to be moved along the travel rail, e.g. thrust to and fro, slid to and fro, positioned to and fro, by at least one robot through temporary drive contacts, e.g. push and/or pull drive contacts. This can be achieved virtually aimlessly (e.g. arbitrarily or randomly). However, in some embodiments, the at least one robot is configured to move the protective shield device to predefined positions along the travel rail.

In such embodiments, the protective shield device may be configured for free movability along the travel rail, e.g. for sliding to and fro, thrusting to and fro or positioning to and fro by the at least one robot.

Therefore, in such embodiments, the protective shield device is not configured for stationary, fixed position mounting on the travel rail and/or not for fixed mounting on the at least one robot.

In such embodiments, the protective shield device may be connected to the at least one robot via a pliable, tensile force-transmitting part (e.g. a rope, a chain, etc.) and, thus, such a protective shield device may be bi-directionally moved along the travel rail by a robot, namely, on the one hand, via pushing drive contacts and, on the other hand, via pulling drive contacts through the, e.g., chain or rope.

The feature "drive contacts" is intended to be broadly interpreted and comprises particularly temporary drive contacts between the protective shield device and the at least one robot. The drive contacts can be configured as, e.g., pull, slide, impact and/or thrust contacts. The drive contacts can be configured as relatively short impact contacts or relatively long slide contacts. The pull contacts can be transmitted from the at least one robot to the protective shield device, for example, via a pliable part (e.g. rope, chain, etc.).

In one such embodiment, the protective shield device is freely movably mounted between two robots on the travel rail in order to be moved (e.g. positioned, slid, etc.) by the robots during an application process through sliding along the travel rail.

In some additional embodiments of a protective shield device of the present disclosure configured for mounting on the travel rail, the protective shield device has its own drive device (e.g. drive motor), by operation of which the protective shield device is movable, particularly motor-driven, along the travel rail. The drive device can comprise, for example, a frictional wheel drive, a pneumatic cylinder drive, etc.

According to the principles of the present disclosure, the protective shield device and/or the robot are preferably provided with a co-travelling buffer (e.g. one or more impact-absorbing elements), by which the drive contacts between the protective shield device and the robot can be at least slightly buffered, e.g. dampened or weakened. At least one plastic element can be used, for example, as buffer. The buffer can be constructed one-sided or two-sided laterally to the protective shield device and/or the robot.

In some embodiments of a protective shield device of the present disclosure configured for mounting on the travel rail, the protective shield device is provided with at least one dispensing unit for dispensing a lubricant (e.g. grease) onto the travel rail. In certain circumstances, sections of the travel rail may be uncovered during an application process and there may be some a risk that the application medium, e.g. paint, in the form of overspray, may land on parts of the travel rail. The lubricant prevents or at least reduces the application medium adhering to the travel rail.

In such embodiments, the dispensing unit may be connected to a lubricant device, which is used as a container for the lubricant and is configured to admit the lubricant to the dispensing unit, and the dispensing unit may be mounted on the mounting device in order to be able to dispense the lubricant onto the travel rail. Such a dispensing unit and a lubricant device may be configured as a so-called long-term lubricant unit.

In some embodiments, the protective shield device according to the present disclosure comprises a supporting structure. The supporting structure is used to support at least one of the following: the protective shield, the at least one mounting device, the at least one dispensing unit, the at least one lubricant device and/or the buffer. The supporting structure can be configured, for example, as a panel or frame, particularly a grid frame.

As mentioned above, in some embodiments, a protective shield device is configured to be mounted on a robot in a fixed manner and includes at least one suitable mounting device. Accordingly, such a protective shield device according to the principles of the present disclosure can be moved together with the robot along the travel rail.

In some such embodiments, the robot comprises a mounting base, and may further have one or more mounting devices (e.g. guide carriages) for movable mounting on the travel rail.

In such embodiments, the protective shield device is configured for mounting on the mounting base of the robot.

In some such embodiments, the protective shield is configured to be positioned laterally beside the robot, particularly laterally beside the mounting base. In some such embodiments, the protective shield device comprises two protective shields, each respectively positioned laterally beside the robot, particularly its mounting base.

Accordingly, in such embodiments, the at least one protective shield may be used not only to protect the travel rail from the application medium dispensed by the application element, but also to protect the robot from the application medium, particularly its mounting base.

The protective shield according to the principles of the present disclosure is configured so that it spans the travel rail in height or vertical direction. The protective shield can be provided above and/or below with a flange section shaped towards the travel rail (e.g. arched or bent).

The protective shield may have a material thickness of less than 5 mm, less than 4 mm, less than 3 mm or even less than 2 mm and can be, for example, a metal or plastic part.

The protective shield may be panel-shaped and/or planar (e.g. with a material thickness of less than 16 mm, 14 mm, 12 mm, 10 mm, 6 mm, 4 mm or 2 mm).

Such a panel-shaped or planar protective shield can be stiff, substantially rigid, or at least negligibly flexible.

In some embodiments, the protective shield may be movable in its entirety. Alternatively or additionally, the protective shield device and/or the protective shield comprises no stationary mounting point.

In some embodiments, the protective shield has a substantially planar protective surface.

The protective shield is configured to be open with respect to at least a portion of the travel rail, e.g. for three-sided screening (particularly front and optionally above and/or below screening).

The protective shield may be configured to extend only partially along the section of the travel rail to be protected. According to the principles of the present disclosure, through movement, the protective shield can nevertheless provide protection to the entire (larger) section to be protected.

An assembly or installation according to the present disclosure comprises at least a robot, e.g. a painting robot, and at least a protective shield device as described herein.

In addition, an assembly or installation according to the principles of the present disclosure comprises a travel rail (travel axis) having at least one robot, e.g. a painting robot, and at least one protective shield device, as described herein. In particular, at least one robot having an application element is movably mounted along the travel rail. In some embodiments, at least two robots are movably mounted along the travel rail.

In some embodiments, at least two robots and one protective shield device (as described herein) are mounted on the travel rail, and the protective shield device is arranged between the two robots in order to be moved along the travel rail by the robots through drive contacts, particularly slid to and fro, thrust to and fro or positioned to and fro.

Alternatively or additionally, in some embodiments, at least two robots are arranged on the travel rail and a protective shield device (as described herein) is mounted on at least one of the robots being movable together with that robot. In some such embodiments, a protective shield device is mounted on each of the two robots in order for each to be movable together with the respective robot.

The application element of the present disclosure may be used for the application of an application medium, preferably on motor vehicle bodies and/or attachment parts therefor.

The application element is, in some embodiments, an atomizer (e.g. a rotary atomizer).

The application medium is, in some embodiments, paint.

The at least one robot may be, e.g., a painting robot.

The at least one robot is, in some embodiments, a multi-axis robot, e.g. with at least 4, 5 or 6 movement axes, in addition to the movement axis provided by the travel rail.

The robot may include a drive unit used to move the robot along the travel rail.

DRAWINGS

Figure 2:
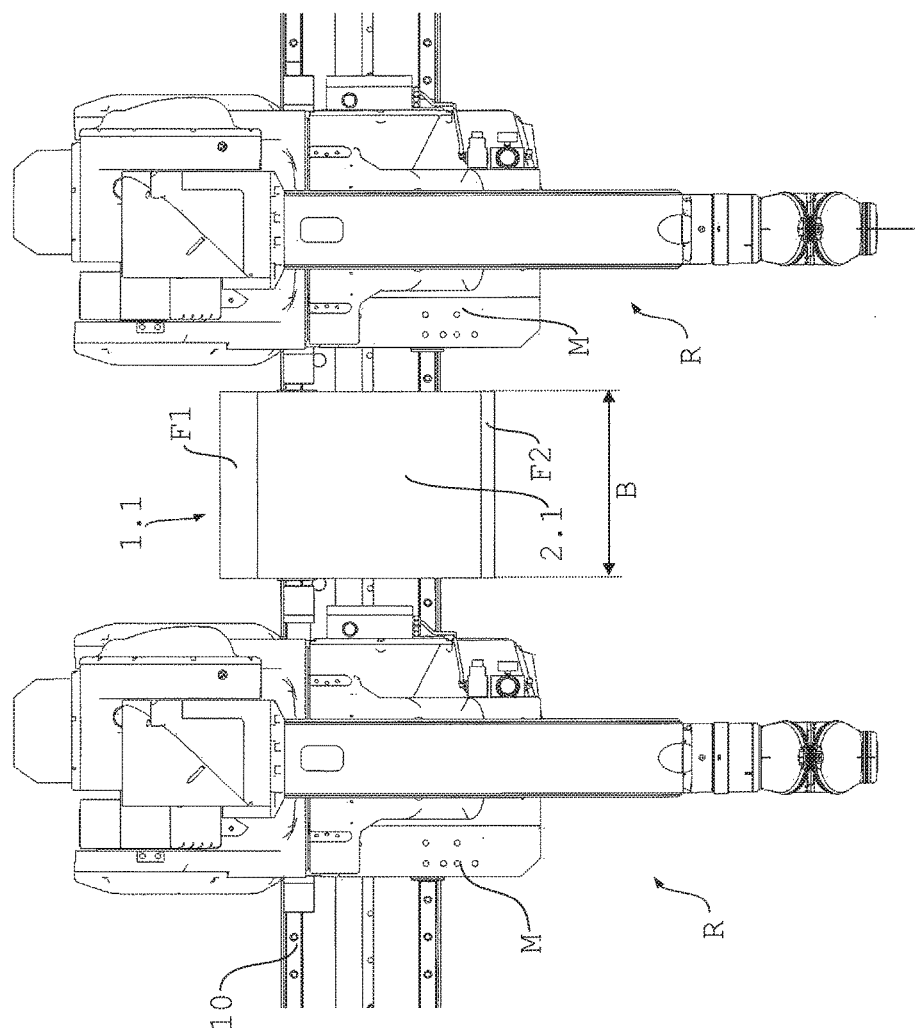
Figure 3:
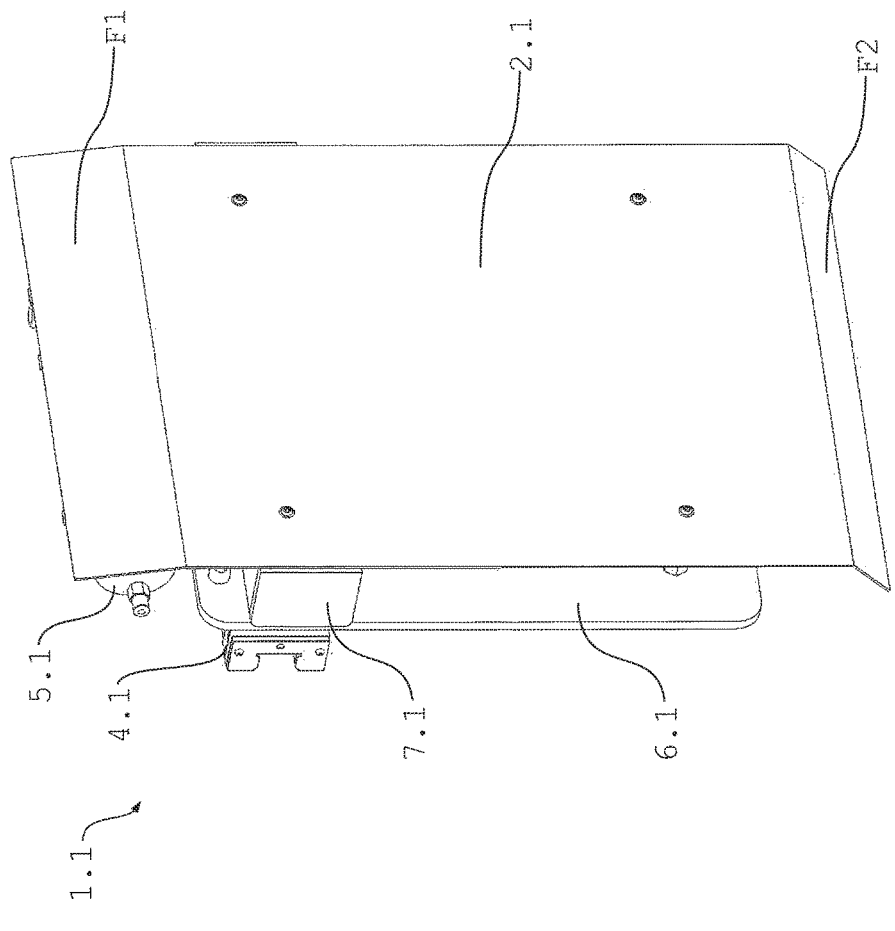
Figure 4:
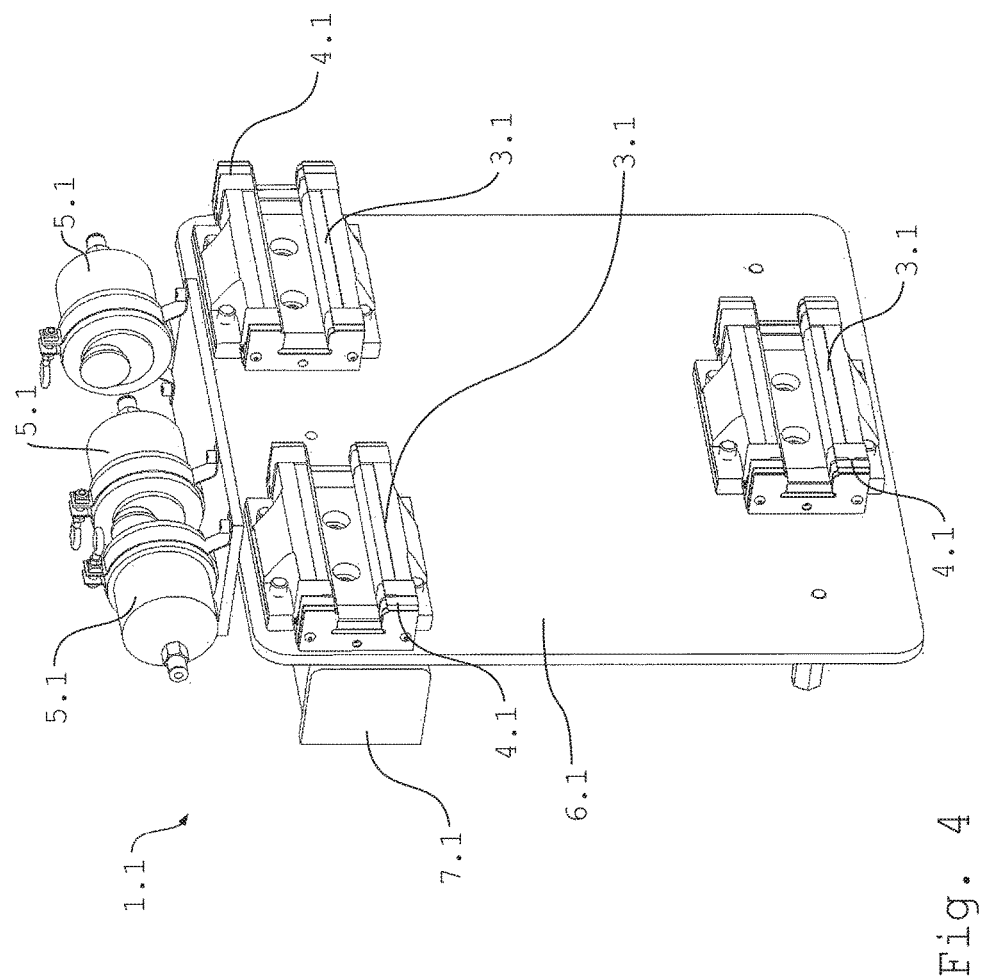
Figure 5:
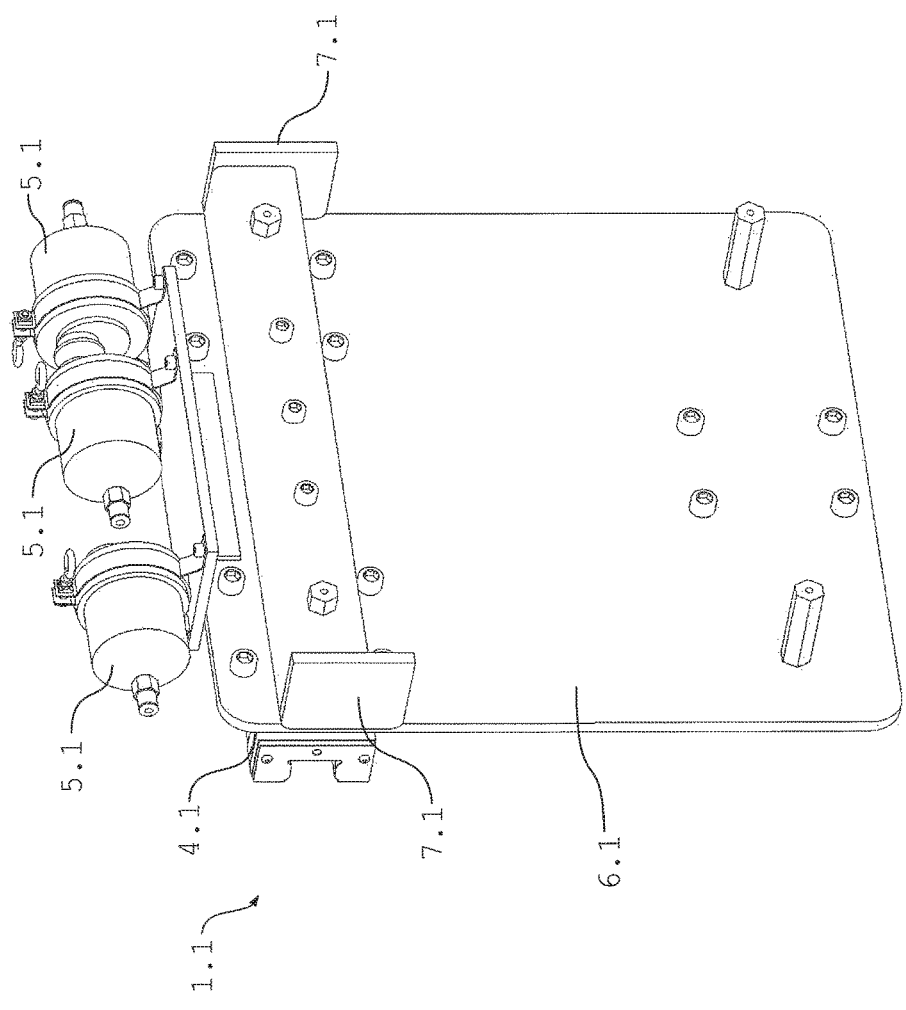
Figure 6:
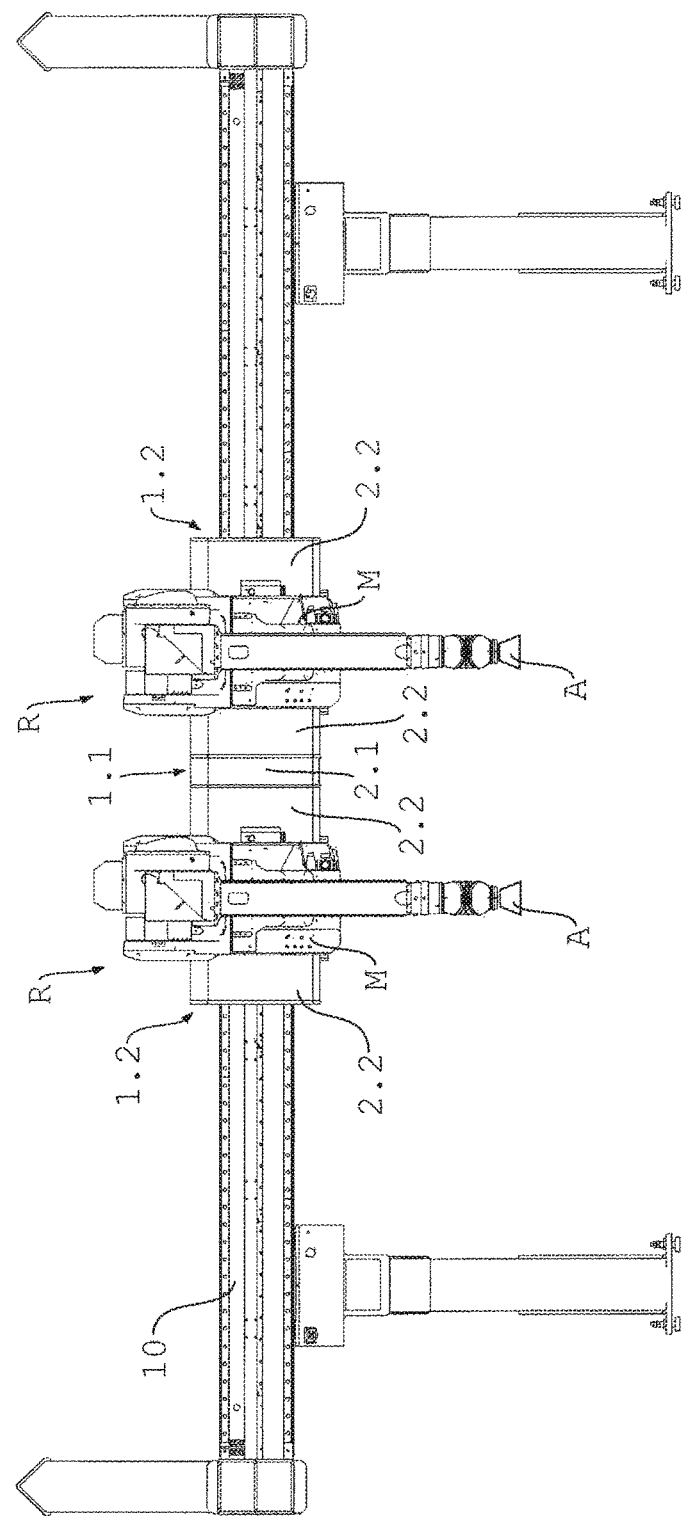
Figure 7:
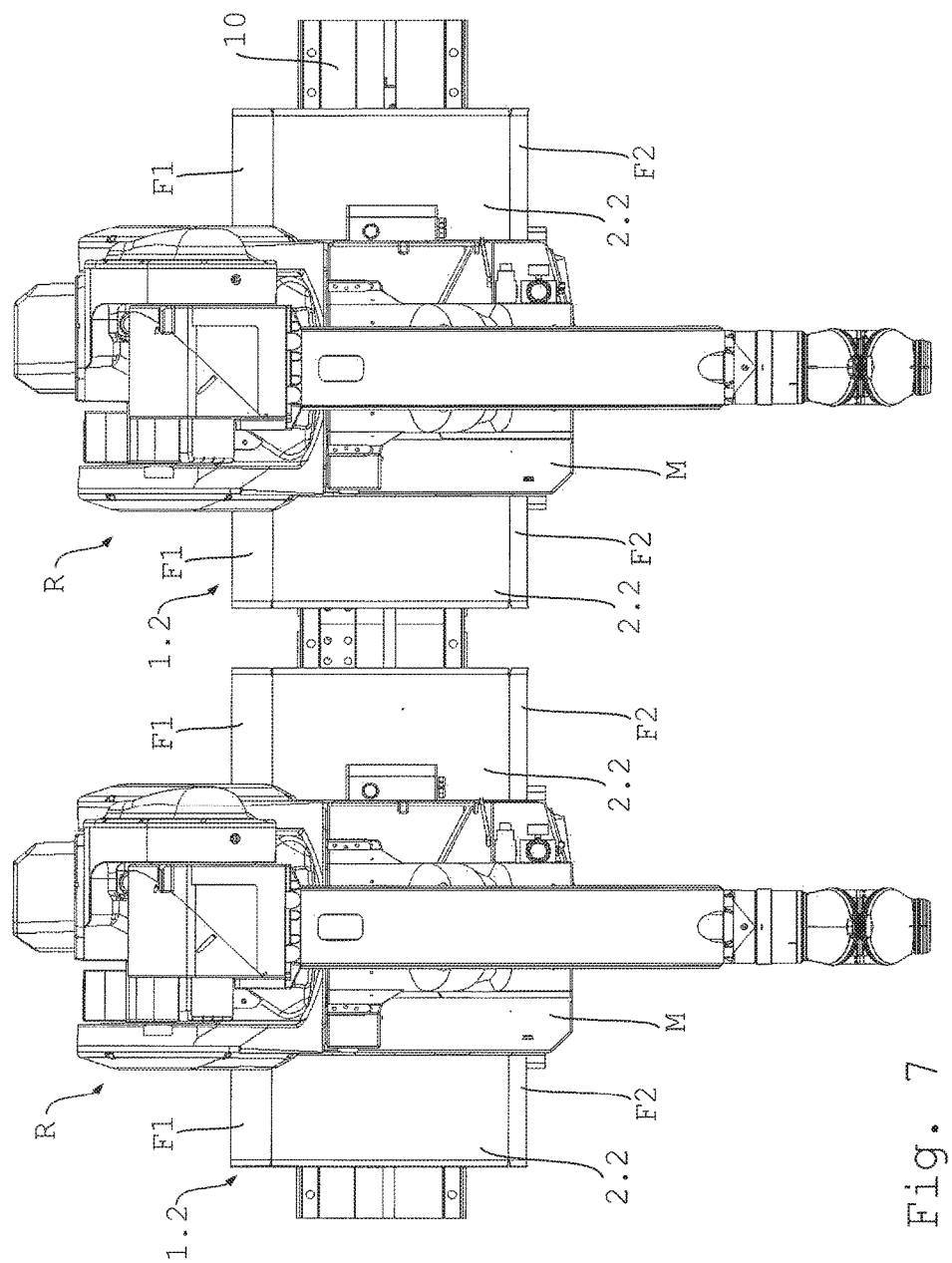
Figure 8:
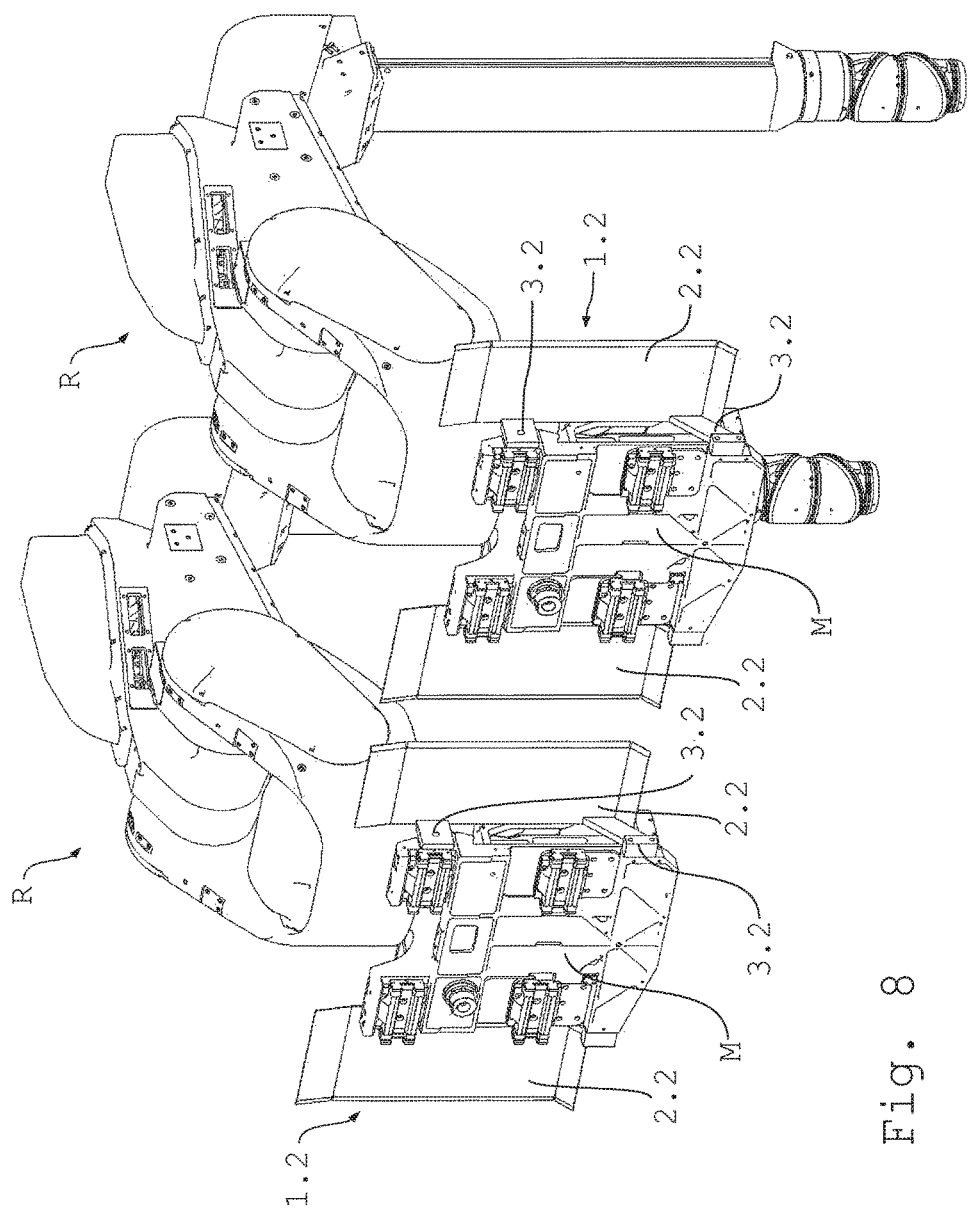

Other features of the disclosure are disclosed in t the following description in association with the attached figures, in which:

FIG. 1 shows a front view of a travel rail with two robots and a protective shield device according to an embodiment of the disclosure, FIG. 2 shows an enlarged view of the robots and the protective shield device of FIG. 1, FIG. 3 shows a perspective view of the protective shield device of FIGS. 1 and 2, FIG. 4 shows a partial perspective rear view of the protective shield device of FIGS. 1 to 3, with protective shield component removed, FIG. 5 shows a partial perspective front view of the protective shield device of FIGS. 1 to 4, FIG. 6 shows a front view of a travel rail with two robots and several protective shield devices according to an embodiment of the disclosure, FIG. 7 shows an enlarged view of the robots along with protective shield devices of FIG. 6, FIG. 8 shows a perspective rear view of the robots along with protective shield devices of FIGS. 6 and 7, and FIG. 9 shows an enlarged perspective rear view of a robot along with protective shield device of FIGS. 6 to 8.

DETAILED DESCRIPTION

FIG. 1 shows a travel rail (robot travel axis) 10 having two robots R, preferably of identical construction, which are movable along the travel rail 10, said movability being indicated schematically by two double arrows in FIG. 1. The travel rail 10 is supported on pillars, but alternatively can also be mounted on a booth wall, particularly a paint booth wall.

The robots R each have an application element A for applying an application medium. The application element A is configured as schematically represented atomizer A. The application medium is paint. The atomizers A are used particularly for coating not shown motor vehicle bodies and/or attachment parts therefor.

The robots R are configured as multi-axis robots with preferably 6 movement axes, in addition to the movement axis provided by the travel rail 10.

The robots R comprise a mounting base M, with which they are movably mounted on the travel rail 10.

FIG. 1 further shows an exemplary protective shield device 1.1 according to the disclosure. The protective shield device 1.1 is arranged between the two robots R and mounted on the travel rail 10 freely movably, which is indicated schematically in FIG. 1 by the double arrow. The protective shield device 1.1 comprises a protective shield 2.1, which is used to protect the travel rail 10 from the paint dispensed by the atomizer A. The protective shield device 1.1 consequently is used as protection, particularly screening, for the travel rail 10 from overspray and direct spraying with paint during a painting process.

The protective shield 2.1 is, in some embodiments, configured to be panel and/or planar shaped.

The protective shield device 1.1 is driveless and freely mounted, relative to the travel rail 10, between the robots R in order to be positioned by the robots R during the painting process by sliding, through drive contacts of the robots R, along the travel rail 10. However, alternatively to the driveless embodiment, it is possible to provide the protective shield device 1.1 with its own drive device, e.g. a frictional wheel drive or a pneumatic cylinder drive, by which the protective shield device 1.1 can be driven and thus moved along the travel rail 10.

FIG. 2 shows an enlarged view of the robots R and particularly the protective shield device 1.1 in FIG. 1.

The protective shield 2.1 is configured so that it spans the travel rail 10 in height or vertical direction. The protective shield 2.1 is provided above with a flange section F1 shaped towards the travel rail 10 and below with a flange section F2 shaped towards the travel rail 10.

The protective shield device 1.1 itself has no drive such as a motor, etc. The protective shield device 1.1 is movable along the travel rail 10 through drive contacts of the robots R, e.g. can be slid to and fro or thrust to and fro. This even enables sections of the travel rail 10 to be protected from soiling, to which the robots R are not themselves moved.

In some embodiments, the sliding of the protective shield device 1.1 can be controlled to predefined positions along the travel rail 10.

In some embodiments, the protective shield 2.1 has a width B of between 200 mm-600 mm, and, in some such embodiments, particularly 400 mm+/−50 mm.

FIG. 3 shows a perspective view of the protective shield device 1.1 of FIGS. 1 and 2. It can be seen from FIG. 3, for example, that the protective shield 2.1 is constructed from a relatively thin-walled part, e.g. a metal or plastic part. It can also be seen from FIG. 3 that the protective shield device 1.1 is a separate component from the robots R. Furthermore, FIG. 4 partially shows a dispensing unit 4.1 for dispensing lubricant onto the travel rail 10, a lubricant device 5.1, which receives the lubricant and pushes it to the dispensing unit 4.1 with a pressing device. A supporting structure 6.1 and a buffer 7.1 are described in more detail below.

FIG. 4 shows an exemplary rear view of the protective shield device 1.1.

Referring to FIG. 4, three mounting devices 3.1, particularly 3 guide carriages, are provided, which mounting devices 3.1 are configured to be movably mounted on the travel rail 10. The mounting devices 3.1 are each provided with a dispensing unit 4.1 for dispensing the lubricant (e.g. grease) onto the travel rail 10. The dispensing units 4.1 are each connected to a lubricant device 5.1 for admitting the lubricant. Use of the lubricant on the travel rail 10 may provide, e.g., reduced friction and that, if paint lands on the travel rail 10 despite the protective shield device 1.1, it adheres less well, or not at all, to the travel rail 10.

The protective shield device 1.1 is provided with an elastic buffer 7.1 (e.g. one or more absorbing elements). The buffer 7.1 is used to buffer at least slightly the drive contacts, i.e. partially absorb forces from push and impact contacts of the robots R onto the protective shield device 1.1.

With continued reference to FIG. 4, the protective shield device 1.1 comprises a panel-shaped supporting structure 6.1, which directly or indirectly supports the protective shield 2.1, the mounting devices 3.1 including the dispensing units 4.1, the lubricant devices 5.1 and the buffer 7.1.

FIG. 5 shows a partial front view of the protective shield device 1.1 of FIGS. 1 to 4, with the protective shield 2.1 removed for presentation purposes.

It can be seen from FIG. 5, for example, that the buffer 7.1 includes portions at two laterally opposing sides on the protective shield device 1.1. In such embodiments, the two buffer elements may partially absorb, i.e. buffer, drive contacts from left and right, i.e. from either lateral direction along the travel rail 10.

In some embodiments of the disclosure, the protective shield device 1.1 can be connected to a robot R via a rope or another pliable, tensile force-transmitting part (not shown). With such a configuration, the protective shield device 1.1 is bi-directionally movable along the travel rail 10 by one robot R, namely, on the one side, via push contacts and, on the other side, via pull contacts.

FIG. 6 shows a travel rail 10 with two robots R and a protective shield device 1.1, as described with reference to FIGS. 1 to 5.

In such embodiments as shown in FIG. 6 the robots R are each provided with a protective shield device 1.1 and an additional protective shield device 1.2. It should be understood that the robots R and the additional protective shield devices 1.2 are configured in substantially identical construction so that the following description is not repeated for each of the robots, i.e. it refers to only one robot R and only one protective shield device 1.2, but it applicable to each.

The protective shield device 1.2 is fixedly mounted on the robot R so that it is moved along the travel rail 10 together with the robot R if the robot R moves along the travel rail 10. The protective shield device 1.2 comprises two protective shields 2.2, which protrude laterally on both sides, virtually to the left and right, from the robot R and are used to protect the travel rail 10 from the paint dispensed by the atomizer A. The protective shield device 1.2 is consequently used as protection, particularly screening, for the travel rail 10 from overspray and direct spraying with paint during a painting process.

FIG. 7 shows an enlarged view of the robots R and particularly the protective shield devices 1.2 of FIG. 6.

The protective shields 2.2 are configured so that they span the travel rail 10 in height or vertical direction. The protective shields 2.2 are provided above with a flange section F1 shaped towards the travel rail 10 and below with a flange section F2 shaped towards the travel rail 10.

FIG. 8 shows a perspective rear view of the robots R and the protective shield devices 1.2 of FIGS. 6 and 7.

FIG. 8 shows in particular the mounting base M for the movable mounting of the robot R onto the travel rail 10. The mounting base M is described in more detail with reference to FIG. 9.

It can be seen from FIG. 8 that the protective shield device 1.2 is used not only as soiling protection for the travel rail 10 but also as soiling protection for the robot R, particularly its mounting base M.

Furthermore, FIG. 8 shows the mounting devices 3.2, by which the protective shields 2.2 are mounted on the robot R. The mounting devices 3.2 are coupled to, or mounted on, the mounting base M and configured as flange-screw connections.

FIG. 9 shows an enlarged view of the mounting base M and the protective shield device 1.2 of FIG. 8.

With particular reference to FIG. 9, the mounting base M is mountable on the travel rail 10 through four mounting devices (guide carriages) 8.2. The mounting devices 8.2 are each provided with a dispensing unit 4.2 for dispensing lubricant onto the travel rail 10. The dispensing units 4.2 can be connected to lubricant devices, not visible in FIG. 9, for storing and admitting the lubricant, similar to the description above with reference to the protective shield device 1.1.

In some embodiments, the protective shield device 1.2 and/or the robot R can also be provided with a lateral buffer, such as disclosed herein.

In some embodiments, the disclosure is applied in a painting installation for motor vehicle bodies and/or attachment parts therefor.

It should be understood that the disclosure is exemplary and, thus, not limited to the embodiments described herein. Rather, a plurality of variants and modifications are possible, which also make use of the inventive concepts and thus fall within the scope of protection.

The invention claimed is:

1. A coating installation assembly comprising:
   a laterally extending travel rail;
   a first and a second robot mounted for lateral movement on the travel rail in a spaced relationship; at least one of the first and second robots including an application element for dispensing a coating, and;
   a protective shield coupled to the travel rail to slidably move on the travel rail, the protective shield being located between the first and second robots, the protective shield not rigidly connected to either the first or second robots, the protective shield having a height spanning the travel rail such that the travel rail is substantially entirely shielded, and the protective shield including slide contacts.

2. The coating installation assembly of claim 1 wherein the protective shield further comprises an upper flange and a lower flange, the upper and lower flanges shaped toward the travel rail.

3. The coating installation assembly of claim 2 wherein the protective shield includes an elastic buffer.

4. The coating installation assembly of claim 1 wherein the protective shield is freely mounted to the travel rail.

5. The coating installation assembly of claim 4 wherein the protective shield is connected to the first robot with a pliable tensile force transmitting part.

6. The coating installation assembly of claim 5 wherein the pliable tensile force transmitting part is a rope.

7. The coating installation assembly of claim 1 wherein the protective shield further comprises a drive device.

8. The coating installation assembly of claim 7 wherein the driving device includes a frictional wheel.

9. The coating installation assembly of claim 1 wherein the protective shield further comprises a dispensing unit for dispensing a lubricant.

* * * * *